United States Patent Office 2,786,841
Patented Mar. 26, 1957

2,786,841

BARBITURIC ACID PRODUCT

Cornelius K. Cain, Flourtown, Pa., assignor to McNeil Laboratories, Incorporated, Philadelphia, Pa., a corporation of Pennsylvania No Drawing. Application August 18, 1954,
Serial No. 450,817

7 Claims. (Cl. 260—257)

The present invention relates to novel chemical compounds; and, more particularly, the present invention relates to novel barbituric acid compounds possessing valuable therapeutic properties.

Certain of the barbituric acid compounds, especially some of the 5,5-disubstituted barbituric acids and salts thereof, have long been known to possess stimulant properties. Also well known is the common depressant or sedative activity associated with barbituric acid compounds.

It is the principal object of the present invention to provide novel chemical compounds having valuable therapeutic properties.

It is another object of the present invention to provide novel barbituric acid compounds possessing valuable stimulant properties.

Still another object of the present invention is to provide novel barbituric acid compounds possessing stimulant properties with negligible depressant activity.

A further object is to provide novel barbituric acid compounds possessing outstanding stimulant activity, as compared with barbituric acid compounds closely related thereto and with other common barbituric acid compounds.

Other objects will become apparent from a consideration of the following specification and the claims.

The novel compounds of the present invention are the 5,5-disubstituted barbituric acids possessing the following fundamental structure:

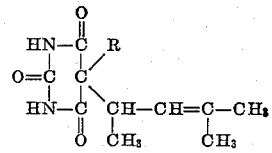

wherein R is a hydrocarbon chain containing from 2 to 3 carbon atoms, preferably an ethyl group or an allyl group; and salts thereof.

The compounds of the invention, particularly the ethyl and allyl derivatives, possess outstanding stimulant properties for the central nervous system. The compounds are active upon oral administration. In addition, and of prime importance insofar as the present invention is concerned, the compounds lack any easily measurable amount of depressant activity such as normally found in barbituric acid derivatives. The stimulant properties of the compounds of the invention are outstanding; and, in fact, it has been found that the stimulant activity of the preferred compounds is on the order of about ten times greater than that of very closely related compounds, such as the 5-ethyl-5-(1,3-dimethylbutyl) barbituric acid referred to in the literature and reported to be the most stimulating of the barbituric acid compounds known.

As stated, the invention includes not only the 5,5-disubstituted barbituric acids possessing the foregoing formula, but also the salts thereof. The salts of the barbituric acids of the present invention can be readily prepared by reaction between the acid and an equivalent amount of a compound containing the desired cation. Any toxicity imparted by the cation will be taken into consideration in the administration of the compounds as is customary in the art. The preferred salts are those which are not substantially more toxic than the barbituric acid from which they are prepared, and which can be incorporated in either liquid or solid pharmaceutical extending media. Such salts are generally referred to as pharmaceutically useful salts from which therapeutically useful compositions may be prepared. Thus, as is conventional in the preparation and use of barbituric acid compounds, the compounds may be prepared and/or administered in the form of, for example, the alkali metal salts, alkaline earth metal salts, ammonium salts, substituted ammonium salts, such as those of ethanolamine, ethylenediamine, and the like, all of which are anionic salts of the stated barbituric acids.

The barbituric acid derivatives of the present invention may be readily prepared by reacting one mol of urea with one mol of a suitable malonic acid ester providing the desired R group. This reaction may take place in an alcohol medium in the presence of sodium ethoxide as by refluxing for several hours, following which the alcohol is removed by distillation. The residue may then be dissolved in water and the product precipitated by acidification of the solution.

The compounds of the present invention and their preparation may be more readily understood from the consideration of the following specific examples which are given for the purpose of illustration only and are not intended to limit the scope of the invention in any way.

Example I

A mixture of 27 g. (0.1 mol) of diethyl ethyl (1,3-dimethyl-2-butenyl) malonate and 18 g. (0.3 mol) of dried urea is added to a solution of sodium ethoxide prepared from 200 cc. of absolute ethanol and 6.9 g. (0.3 mol) of sodium and the reaction mixture is refluxed for 30 hours. The alcohol is removed by vacuum distillation and the residue heated under vacuum 1 hour in a boiling water bath. The residue is cooled, dissolved in crushed ice and water and the solution extracted with ether, keeping the temperature below 5° C. The solution is then made acid with 6 N sulfuric acid, temperature not over 5° C., and is extracted with ether. The ether extract is evaporated and the oily residue stirred with hot heptane cooled and filtered. The solid is recrystallized from a mixture of benzene and heptane. The resulting 5-ethyl-5-(1,3-dimethyl-2-butenyl) barbituric acid melts at 134–135° C.

The calculated nitrogen analysis for $C_{12}H_{18}N_2O_3$ is N, 11.8; that found is N, 11.5.

Injection of as little as .05–.1 mg. of the compound intravenously per kilogram of body weight produces typical and obvious symptoms of central nervous system stimulation without any apparent deleterious side effects.

Example II 5-allyl-5-(1,3-dimethyl-2-butenyl) barbituric acid may be prepared by following the foregoing procedure but using diethyl allyl-(1,3-dimethyl-2-butenyl) malonate in place of the diethyl ethyl-(1,3-dimethyl-2-butenyl) malonate.

Example III

An aqueous suspension of 5-ethyl-5-(1,3-dimethyl-2-butenyl) barbituric acid prepared in accordance with Example I is treated with an equivalent amount of sodium hydroxide to prepare the corresponding sodium salt. The resulting solution is evaporated to dryness to yield sodium 5-ethyl-5-(1,3-dimethyl-2-butenyl) barbiturate, a white powder which decomposes upon heating.

Modification is possible in the selection of the particular derivative coming within the general formula set forth herein as well as in the particular salt form selected without departing from the scope of the invention.

I claim:

1. 5,5-disubstituted barbituric acid compounds selected from the group consisting of the acids having the structural formula:

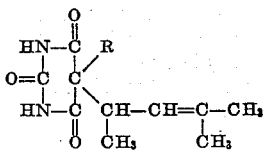

wherein R is selected from the group consisting of ethyl and allyl groups, and non-toxic salts selected from the group consisting of alkali metal salts, alkaline earth metal salts, ammonium salts, ethanolamine salts, and ethylenediamine salts.

2. 5-ethyl-5-(1,3-dimethyl-2-butenyl) barbituric acid.

3. A non-toxic alkali metal salt of 5-ethyl-5-(1,3-dimethyl-2-butenyl) barbituric acid.

4. The sodium salt of 5-ethyl-5-(1,3-dimethyl-2-butenyl) barbituric acid.

5. 5-allyl-5-(1,3-dimethyl-2-butenyl) barbituric acid.

6. A non-toxic alkali metal salt of 5-allyl-5-(1,3-dimethyl-2-butenyl) barbituric acid.

7. The sodium salt of 5-allyl-5-(1,3-dimethyl-2-butenyl) barbituric acid.

References Cited in the file of this patent

Velluz et al.: Ann. Pharm. Francais 9, 271–275 (1951).
Ballem et al.: Canad. Med. Assoc., J. 58, 447–50 (1948).